US012776733B2

(12) United States Patent
Benarous et al.

(10) Patent No.: US 12,776,733 B2
(45) Date of Patent: Oct. 27, 2026

(54) CONTROL SCHEME FOR STARTING DUAL CHANNEL PERMANENT MAGNET MOTOR DRIVE SYSTEM UNDER OSSC FAULT OF ONE CHANNEL

(71) Applicant: Goodrich Actuation Systems Limited, Shirley (GB)

(72) Inventors: Maamar Benarous, Coventry (GB); Mohamed Elsayed Rashed Mohamed Alabassy, Nottingham (GB)

(73) Assignee: GOODRICH ACTUATION SYSTEMS LIMITED, Shirley (GB)

( * ) Notice: Subject to any disclaimer, the term of this patent is extended or adjusted under 35 U.S.C. 154(b) by 234 days.

(21) Appl. No.: 18/657,028

(22) Filed: May 7, 2024

(65) Prior Publication Data

US 2024/0388232 A1 Nov. 21, 2024

(30) Foreign Application Priority Data

May 16, 2023 (EP) .................................... 23173759

(51) Int. Cl.
*H02P 21/00* (2016.01)
*H02P 21/30* (2016.01)
*H02P 21/34* (2016.01)

(52) U.S. Cl.
CPC .............. *H02P 21/34* (2016.02); *H02P 21/30* (2016.02); *H02P 2207/05* (2013.01)

(58) Field of Classification Search
CPC .......... H02P 21/34; H02P 21/30; H02P 21/20; H02P 25/22; H02P 2207/05; H02P 21/22; H02P 25/098; H02P 27/06; H02P 23/30; H02P 6/08; H02P 6/085; H02P 29/027; H02P 29/024
See application file for complete search history.

(56) References Cited

U.S. PATENT DOCUMENTS

| | | | |
|---|---|---|---|
| 8,040,081 | B2 | 10/2011 | Shimana |
| 9,024,564 | B2 | 5/2015 | Kinouchi et al. |
| 9,300,233 | B2 | 3/2016 | Uchida |
| 9,673,744 | B2 | 6/2017 | Eberlein et al. |

(Continued)

FOREIGN PATENT DOCUMENTS

| | | | | |
|---|---|---|---|---|
| CN | 107959362 A * | 4/2018 | | H02K 1/146 |
| EP | 3131198 A1 | 2/2017 | | |

OTHER PUBLICATIONS

Dieterle Oliver et al. "Control of a PMSM with Quadruple Three-Phase Star-Connected Windings Under Inverter Short-Circuit Fault", IEEE Transactions on Industrial Electronics, vol. 66, No. 1, Jan. 1, 2019, pp. 685-695.

(Continued)

*Primary Examiner* — Karen Masih
(74) *Attorney, Agent, or Firm* — CANTOR COLBURN LLP

(57) ABSTRACT

A control scheme for starting a dual channel permanent magnet motor drive system under a one-switch short circuit (OSSC) fault on one channel in which the reference torque used for controlling the faulty channel is varied as a function of motor speed according to a certain predefined function to optimise the torque produced by the faulty channel whilst also keeping the current within the faulty channel below the current limit of the power inverter within the faulty channel.

16 Claims, 6 Drawing Sheets

(56) References Cited

U.S. PATENT DOCUMENTS

| | | | |
|---|---|---|---|
| 10,320,183 | B2 | 6/2019 | Benarous et al. |
| 11,095,237 | B2 | 8/2021 | Yukawa et al. |
| 11,356,050 | B2 | 6/2022 | Horiuchi |
| 2012/0313564 | A1 | 12/2012 | Guitard et al. |
| 2017/0012569 | A1 | 1/2017 | Koseki et al. |
| 2017/0047728 | A1 | 2/2017 | Benarous et al. |

OTHER PUBLICATIONS

European Search Report for Application No. 23173759.4, mailed Oct. 17, 2023, 9 pages.

Mustafa, et al. "Performance Evaluation of a Vector-Control Fault-Tolerant Flux-Switching Motor Drive", IEEE Transactions on Industrial Electronics, vol. 60, No. 8, Aug. 1, 2013, pp. 2997-3006.

* cited by examiner

CONTROL SCHEME FOR STARTING DUAL CHANNEL PERMANENT MAGNET MOTOR DRIVE SYSTEM UNDER OSSC FAULT OF ONE CHANNEL

CROSS REFERENCE TO RELATED APPLICATIONS

This application claims priority to European Patent Application No. 23173759.4 filed May 16, 2023, the entire contents of which is incorporated herein by reference.

TECHNICAL FIELD

The technology described herein relates to dual channel permanent magnet motor drive systems, and in particular to providing techniques for operating such systems in the event of a one switch short circuit ("OSSC") fault within one of the channels.

BACKGROUND

In aircraft, there is currently a trend towards so-called More Electric Aircraft (MEA) whereby loads such as flight control surfaces, landing gear, actuators, fans, pumps etc. which have traditionally been controlled by hydraulic and mechanical systems are now being designed to be controlled electrically by means of an electric motor. For example, Next Generation High Lift Systems (HLS) are envisaged to be highly flexible, distributed and actively controlled using Electro Mechanical Actuators (EMAs) that are driven by an electric motor drive system.

Typical motor drive systems consist of a simple motor driven by an inverter. Safety critical aerospace applications require a certain number of redundancies designed into the system architecture and this cannot be achieved using a simplex motor drive architecture. These redundancies have thus been provided by multi-channel motor drive designs as shown, for example, in FIG. 1. FIG. 1 shows a dual channel (duplex) three phase motor drive system. Thus, in the duplex permanent magnet motor configuration shown in FIG. 1, there are two segregated windings (such that each winding is driven by a separate inverter). When one of the two inverter of these systems develops a fault, the other inverter can take over and control the motor torque. Other numbers of multiple channels can of course also be used for increased redundancy.

To reduce weight and size, permanent magnet motors are often used since they typically have a higher torque-to-power density ratio in comparison to other motor drive alternatives such as switched reluctance or induction motors. An issue with a permanent magnet motor however is that the magnets cannot be switched off under failure of either the motor or the drive. One of the most severe failures is motor winding, or inverter switch shorting, such as a One Switch Short Circuit (OSSC) fault, wherein the inverter loses control over the motor current. Referring to the known inverter topology shown in FIG. 2, the OSSC fault provides natural short circuit paths to the motor currents via the freewheeling diode associated with the short circuited switch. This fault situation is illustrated in FIG. 3. The uncontrolled motor current waveforms under the OSSC fault may produce unacceptably high torque ripples, drag torque and power losses.

One way to manage an OSSC fault is by applying a three phase short circuit to the motor terminals, for example as described in United States Patent Application Publication No. 2017/0047728 (assigned to Goodrich Actuation Systems Limited, and the content of which are incorporated herein in its entirety). The short circuit may be applied by switching on either the top or bottom three switches of the converter, such that the three phase short circuit produces a balanced short circuit motor current and ripples-free drag torque. The magnitude of the drag torque therefore decreases with the increase in motor speed.

However, the Applicants have recognised that whilst the technique proposed in United States Patent Application Publication No. 2017/0047728 (Goodrich Actuation Systems Limited) has certain advantages, the short circuit applied to the three phase windings may create additional drag torque for the healthy channel to overcome in addition to the load torque, which means that the converter and the motor are typically oversized for driving the load torque and the drag torque, especially at the starting mode of the motor.

The Applicants have therefore recognised that there is a need for improvements in the operation of such systems in the event of such OSSC faults.

SUMMARY

According to a first aspect of the technology described herein there is therefore provided a method of operating a dual channel permanent magnet motor drive system, wherein each channel comprises a respective power inverter, the power inverter being controlled to produce torque based on a certain reference torque value. The method includes: determining that one of the channels of the dual channel permanent magnet motor drive system has a one switch short circuit, "OSSC", fault, the dual permanent magnet motor drive system thus having a faulty channel and a healthy channel. During start-up of the motor drive system, whilst the motor speed is below a certain threshold motor speed, the method includes controlling both channels of the dual channel permanent magnet motor drive system to provide torque. The healthy channel is controlled to provide a desired output torque based on a first reference torque, and the faulty channel is controlled to provide an output torque based on a second reference torque, wherein the second reference torque is varied according to a certain function of motor speed.

According to a second aspect of the technology described herein there is provided a dual channel permanent magnet motor drive system, wherein each channel comprises a respective power inverter, the power inverter being controlled to produce torque based on a certain reference torque value. The system includes: a control circuit that is configured to control operation of the motor drive system; and a one switch short circuit, "OSSC", fault detection circuit. The control circuit is configured to so that, when it is determined by the OSSC fault detection circuit that one of the channels of the dual channel permanent magnet motor drive system has a OSSC fault, the dual permanent magnet motor drive system thus having at least one faulty channel, during start-up of the motor drive system, whilst the motor speed is below a certain threshold motor speed to control both channels of the dual channel permanent magnet motor drive system to provide torque. The healthy channel is controlled to provide a desired output torque based on a first reference torque, and wherein the faulty channel is controlled to provide an output torque based on a second reference torque, wherein the second reference torque is varied according to a certain function of motor speed.

The technology described herein relates to dual channel permanent magnet motor drive systems. In such systems, each channel comprises a respective power inverter that can be controlled based on a specified reference torque (i.e. so as to control the inverter current to track a desired reference current equivalent to the reference torque). In particular, the technology described herein provides a novel control scheme for starting a dual channel permanent magnet motor drive system under OSSC faults affecting one of the channels (i.e. such that there is at least one 'faulty' channel and at least one 'healthy' channel).

The control scheme of the technology described herein involves controlling the faulty channel using a reference torque that varies according to a certain, e.g. predefined, function of motor speed. In this way it is possible to control the faulty channel during the start-up cycle to ensure that the faulty channel at least initially provides useful, assistive torque (i.e. rather than drag torque working against the healthy channel) at least at lower motor speeds whilst also reducing the drag torque produced by the faulty channel at higher motor speeds within the start-up cycle, and further also ensuring that the current in the faulty channel does not become too high (i.e. the current can be kept below the inverter current limit).

Thus, the healthy channel can be (and in embodiments is) controlled as normal, using a (first) reference torque that dynamically controls the inverter current to track a desired reference current equivalent to the reference torque.

However, the faulty channel is instead controlled using a (second) reference torque that is controlled according to a certain, e.g. predefined, function of motor speed, with the function of motor speed being selected and determined to keep the motor current within the faulty channel below a certain threshold current value, e.g., and in particular, below the current limit of the power inverter in the faulty channel. The function of motor speed according to which the (second) reference torque is in embodiments further selected and determined to optimise the contribution of the faulty channel in particular by controlling the faulty channel to initially produce assistive torque for a first range of (relatively lower) motor speeds and to reduce drag torque produced by the faulty channel for a second range of (relatively higher) motor speeds.

That is, the (first) reference torque that controls the healthy channel is in embodiments a dynamic reference control that controls the healthy channel based on the current load conditions, e.g. as in the normal (healthy) motor operation. On the other hand, the (second) reference torque that controls the faulty channel is in embodiments varied in a predefined manner, e.g., and in embodiments, independently of the current load conditions.

This novel control scheme can then provide various improvements during the start-up cycle compared to other possible approaches.

For example, in the technique proposed in United States Patent Application Publication No. 2017/0047728 (Goodrich Actuation Systems Limited), especially at lower motor speeds, the faulty channel will produce significant drag torque, thus requiring both channels to be oversized in order to be able to produce enough torque to start the motor in the event that one of the channels experiences an OSSC fault.

Another approach might be to attempt to continue to use the faulty channel as normal, either without current control, or using the normal reference torque value, i.e. corresponding to the same reference torque that is used for the healthy channel for the motor system in question. However, in the event of an OSSC fault, the inverter of the channel loses control over the motor current, as the OSSC fault provides short circuit paths, as described above. This then creates various issues. For example, if performing current control using the normal reference torque (i.e. the same reference torque that is used for the healthy channel), the faulty channel may be able to produce assistive torque at low speeds, but the motor current will significantly increase as the motor speed increases, resulting in unacceptable overheating and drag torque. Using a reduced, but still fixed reference torque (e.g. at 50% of the specified reference value) can reduce the motor current slightly, but starts to introduce significant drag torque such that the healthy motor must work harder, which again means that both channels must generally be oversized to cope with such faults.

In contrast, the inventors have recognised that by varying the reference torque that is used to control the faulty channel according to a certain, e.g. predefined, function of motor speed it is then possible to control the faulty channel such that the motor current remains within acceptable levels whilst still providing useful assistive torque and/or reducing drag torque during the start-up cycle. This in turn means that the faulty channel can be used during start-up to provide some of the required torque and/or that the drag torque associated with the faulty channel can be reduced, e.g. compared to the technique proposed in United States Patent Application Publication No. 2017/0047728 (Goodrich Actuation Systems Limited), which means that the channels can be reduced in size and weight as they do not need to be oversized to overcome such drag torques. Thus, the system performance can be improved without increasing the size and weight of the electronics (or correspondingly, the motor drive system can be reduced in size and weight without reducing its performance).

The reference torque that is used to control the faulty channel can be varied in any suitable and desired manner, according to any suitable function of motor speed, in order to achieve these effects. In embodiments, the reference torque that is used to control the fault channel is varied as a function of motor speed according to a certain, e.g. fixed, e.g. predetermined, relationship that is set based on the characteristics of the permanent magnet motor system. That is, a certain relationship may be defined for the permanent magnet motor system in question which can then be used during start-up in the event that one of the channels is experiencing an OSSC fault. This relationship may be stored in any suitable manner. For example, it may be stored in a look up table. In embodiments the relationship is set to keep the current in the faulty channel below a threshold level and to reduce drag torque. That is, the inventors have recognised that it is possible to characterise a given system to determine such relationship which can then be used to control the operation in a more optimised manner, e.g. to keep the current below a certain threshold (whilst also allowing the faulty channel to produce useful torque and/or to reduce drag torque associated with the faulty channel over a greater range of operating speeds).

The actual relationship that is used may therefore, and generally will, vary depending on the permanent magnet motor system in question. The suitable relationship may therefore, and in embodiments is, determined based on a pre-characterisation and/or simulation of the permanent magnet motor system in question.

For instance, in embodiments, the (second) reference torque that is used to control the faulty channel is initially set to the maximum possible torque that the faulty channel can produce (i.e. is set as 100% of the nominal load torque, where the "nominal load torque" is the maximum torque that the channel can (nominally) produce, and is fixed for the channel in question) in order to maximise the assistive torque that is initially produced and hence reduce the average drag torque associated with the faulty channel. In embodiments, the (second) reference torque is then decreased, e.g., and in embodiments, monotonically decreased from its maximum value as a function of motor speed from zero up to a certain threshold motor speed, by which point the start-up cycle is considered complete. However, the specific rate of decrease may be selected and determined based on the pre-characterisation and/or simulation of the permanent magnet motor system in question.

Thus, in embodiments, during start-up of the motor drive system, whilst the motor speed is below a certain threshold motor speed: the (second) reference torque used for the control of the faulty channel is varied relative to the nominal maximum load torque for the faulty channel as a function of motor speed according to a certain relationship that has been determined based on characterising the permanent magnet motor drive system in question.

In embodiments, the relationship is determined so as to keep the current in the faulty channel below a certain threshold current value and to further control the faulty channel to produce assistive torque within a certain range of motor speeds such that the faulty channel at least initially produces assistive torque.

In embodiments, during start-up of the motor drive system, whilst the motor speed is below a certain threshold motor speed: the (second) reference torque that is used for controlling the faulty channel is monotonically decreased from the nominal maximum load torque for the faulty channel as the motor speed is increased from zero up to the threshold motor speed. Starting from the nominal maximum load torque should generally provide the maximum useful torque from the faulty channel (or the maximum reduction in drag torque). However, this is not necessary. For instance, if starting up under lighter load conditions, it may not be necessary to initially use the nominal maximum load torque, and the control of the faulty channel could instead start from another, lower reference value (which could be a fraction of the (first) reference torque used for the healthy channel, for example). Various arrangements would be possible in this regard.

The technology described herein is thus able to produce useful torque from the faulty channel and/or to reduce the drag torque produced by the faulty channel in the event of that channel experiencing an OSSC fault. The technology described herein can thus particularly deal with situations where one channel is faulty and the other channel is healthy. In that case, the healthy channel may be controlled as normal, e.g. using the specified reference torque.

Once the threshold motor speed is reached, the start-up cycle is then considered complete, and the motor control can then be switched to a different control, e.g., and in embodiments, the control operation that is described in United States Patent Application Publication No. 2017/0047728 (Goodrich Actuation Systems Limited), in which a three-phase short circuit is applied to the motor terminals. Thus, in embodiments, when the motor speed exceeds the certain threshold motor speed, a different control operation is performed. For example, in embodiments, once the threshold motor speed is reached, the method comprises short circuiting each top or bottom switch of the three arms of the inverter in the faulty channel.

Various other arrangements would however be possible for controlling the system after the start-up cycle is complete and the technology described herein particularly relates to the operation during the start-up cycle.

The control circuit (circuitry) for the electric motor system may be implemented in any suitable manner, as desired. For example, this may be implemented either in hardware or software (including embedded software), as desired, using any suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

The methods in accordance with the technology described herein may thus be implemented at least partially using software e.g. embedded software. The controller may thus comprise a suitable microprocessor or microcontroller that is configured to execute software to perform the various operations described herein.

It will thus be seen that when viewed from further embodiments the technology described herein provides software specifically adapted to carry out the methods herein described when installed on a suitable data processor, a computer program element comprising software code portions for performing the methods herein described when the program element is run on a data processor, and a computer program comprising code adapted to perform all the steps of a method or of the methods herein described when the program is run on a data processing system.

Other arrangements would however be possible. For instance, the methods may also be implemented at least partially using appropriately dedicated hardware elements (processing circuitry) and/or programmable hardware elements (processing circuitry, e.g. such as a programmable FPGA (Field Programmable Gate Array)) that form part of the motor controller and can be programmed to operate in the desired manner. It would also be possible to implement the methods described above using analogue logic, for example.

Subject to the requirements of the technology described herein, the motor system may otherwise comprise any suitable and desired features that a permanent magnet motor system may comprise.

In that respect, it will be appreciated that whilst reference is made herein to a dual channel permanent magnet motor system, it will be appreciated that "dual" in this context is intended to mean a system having two or more channels, and that there may in general be any suitable number of channels provided. In that case, the technology described herein may be particularly beneficial so long as there is at least one healthy channel available for controlling the motor once the threshold speed is reached.

BRIEF DESCRIPTION OF DRAWINGS

Various embodiments will now be described, by way of example only, with reference to the drawings.

DETAILED DESCRIPTION

Figure 1:
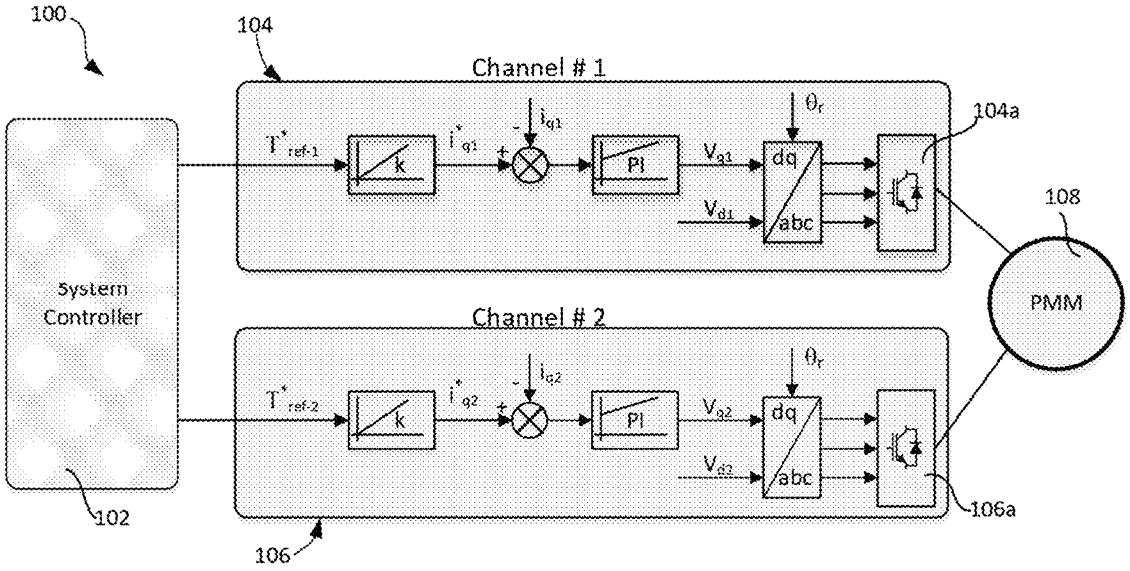
FIG. 1 is a schematic diagram of an example of a duplex permanent magnet motor drive system.

As briefly described above, FIG. 1 shows an example motor drive for a permanent magnetic motor 108. In the system 100 of FIG. 1, the duplex permanent magnet motor comprises two segregated windings, with each winding being driven by a respective, separate channel. The system controller 102 is therefore operably connected to the permanent magnetic motor 108 via two channels 104, 106, each channel comprising a respective inverter circuit 104*a*, 106*a* that provides one or more phases of AC output to its respective motor winding. As shown in FIG. 1, each channel is provided with a respective reference torque (Tref-1, Tref-2) that is used to control the respective operation of that channel. In normal use these reference torques are set based on the current load demand to control the motor drive to produce the required motor torque output. The use of two separate inverters 104*a*, 106*a* each corresponding to one of the channels 104, 106 provides redundancy in the system, as the second inverter (e.g. 106*a*) is able to take over and control the motor torque in the event that the first inverter (e.g. 104*a*) develops a fault. This duplex arrangement is therefore particularly suitable for safety critical applications such as for driving electric motors within aircrafts, such as for High Lift Systems. However, different numbers of channels and inverters may of course be used, as desired.

Figure 2:
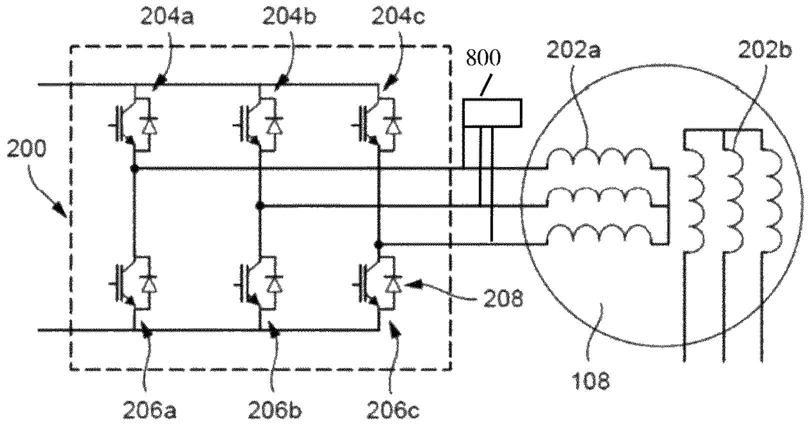
FIG. 2 is a schematic diagram showing an example of a two-level three-phase inverter topology that may be used according to embodiments.

FIG. 2 shows an example of a two-level three-phase inverter circuit 200 that could be used for the respective channels of the system 100 of FIG. 1. Thus, as shown in FIG. 2, the inverter output is operably connected to the windings 202*a* of the first channel which are wound about a permanent magnetic motor 108. Although not shown in FIG. 2, it will be understood that a second equivalent inverter system will be provided for the windings 202*b* of the second channel.

The inverter circuit 200 in FIG. 2 comprises six switches, including three top switches 204*a,b,c* and three bottom switches 206*a,b,c*. Each switch 204/206 is connected in parallel with a respective freewheeling diode 208. Under normal operating conditions, the switches are operable to control the inverter output, e.g. in the normal manner for a switching inverter.

Figure 3:
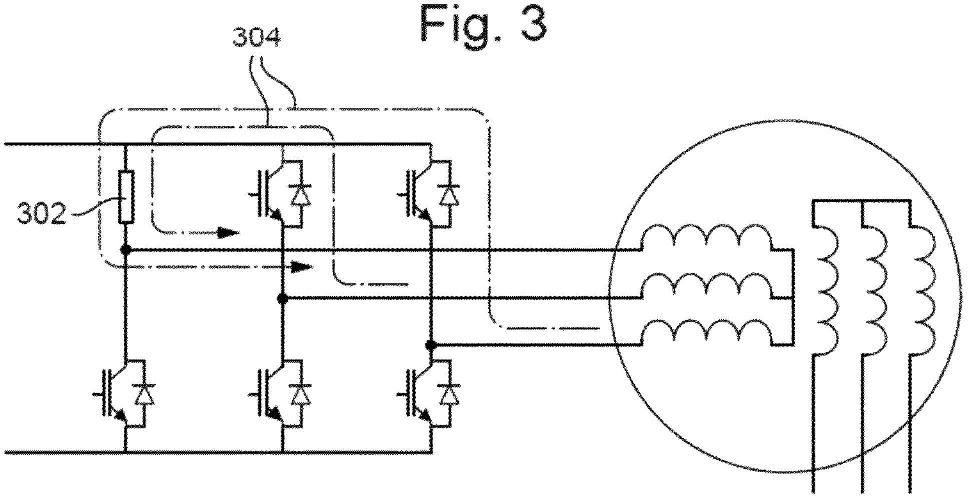
FIG. 3 is a schematic diagram showing an example OSSC fault in the inverter topology of FIG. 2.

FIG. 3 shows schematically the current flow in the inverter circuit 200 of FIG. 2 in the event of an OSSC fault. In this example, a short circuit 302 has occurred at top switch 204*a*. As a result, currents 304 flow via the short circuited path 302. The resulting waveforms from the flow of currents 304 will produce torque ripples and power losses in the motor, as well as drag torque. The inverter is thus no longer able to control the motor current.

The OSSC fault may be managed by applying a three-phase short circuit 800 to the motor terminals as described in United States Patent Application Publication No. 2017/0047728 (Goodrich Actuation Systems Limited). However, in United States Patent Application Publication No. 2017/0047728 (Goodrich Actuation Systems Limited), for operating speeds below the threshold speed, the faulty channel is simply switched off.

The philosophy of the proposed fault management in United States Patent Application Publication No. 2017/0047728 (Goodrich Actuation Systems Limited) is that the average value of the motor drag torque produced by switched-off converter is less than the drag torque produced of a three-phase short circuit at lower speeds (i.e. speeds that are below a certain threshold value). Hence, United States Patent Application Publication No. 2017/0047728 (Goodrich Actuation Systems Limited) proposed to switch off the converter during the starting of the motor until the motor speed reaches the threshold speed. Only when the motor speed reaches the threshold speed are the converter top or bottom switches switched on to create three-phase short circuit to the motor terminal.

The technology described herein relates particularly to an improved control operation in the event of an OSSC fault at lower speeds. In this respect, the inventors have recognised however that there is scope for a more optimised control at lower speeds than simply switching the faulty channel off.

According to the technology described herein, therefore, it is proposed to control the OSSC fault converter current in the speed range from zero up to a threshold speed in order to try to optimise the motor operation, e.g. rather than just switching off the converter as in United States Patent Application Publication No. 2017/0047728 (Goodrich Actuation Systems Limited).

This then enables production of assistive (useful) torque by the faulty channel at very low speeds whilst still ensuring a reduction of the drag torque as the motor speed increases.

Figure 4:
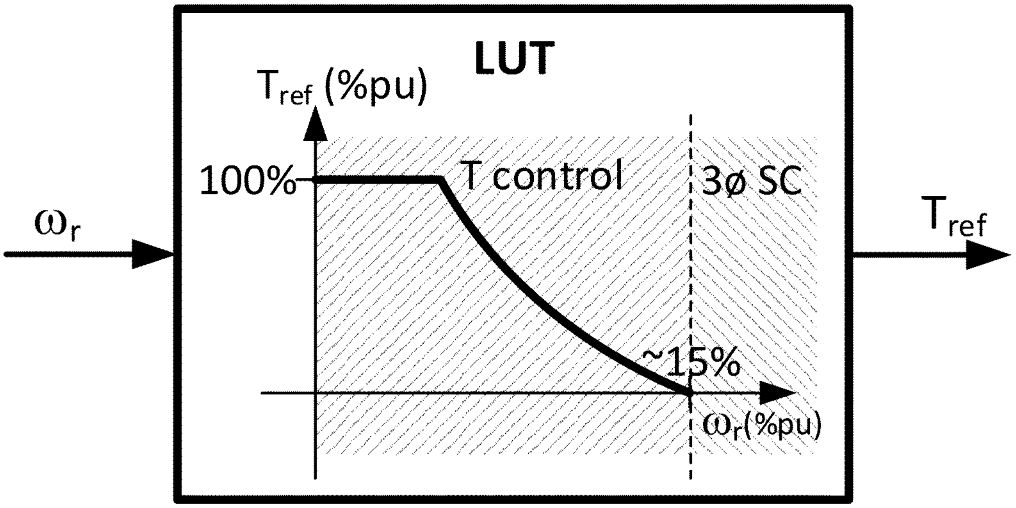
FIG. 4 shows schematically the control scheme according to an embodiment.

In particular, as shown in FIG. 4, according to the present embodiments the reference torque (Tref) for the faulty channel, shown here as a percentage of the nominal maximum torque load, is varied according to a particular relationship as a function of the angular rotational speed (ωr). Thus, in the example illustrated in FIG. 4, the reference torque for the faulty channel starts off at 100% of the nominal maximum torque load but is then monotonically decreased as a function of angular rotational speed (ωr) until the threshold speed is reached (here at 15% of the desired operating speed), at which point the control is switched to the three-phase short circuit control described in United States Patent Application Publication No. 2017/0047728 (Goodrich Actuation Systems Limited).

It will be appreciated that the precise relationship may be determined and selected based on pre-characterisation and/or simulation of the motor system in question, in order to optimise the motor operation, as will be described further below. Thus, once the relationship for a particular system has been determined, it can then be stored in a suitable look up table (as shown in FIG. 4), and then used accordingly for subsequent motor control in the event that a OSSC fault is detected.

Figure 5:
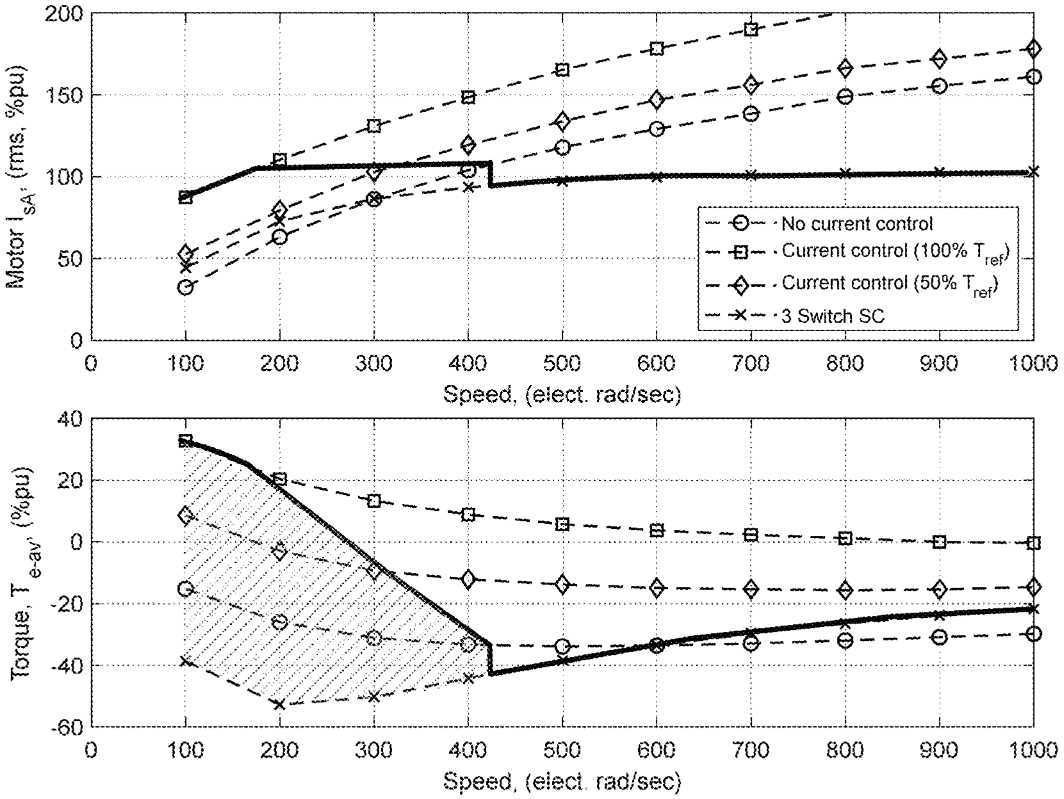
FIG. 5 shows schematically the motor current and torque when implementing a novel control scheme according to the present embodiment compared to various other possible approaches according to a first example.

FIG. 5 shows simulation results for the motor current within the OSSC faulty channel (upper panel) and the average torque produced by the OSSC faulty channel (lower panel), compared to various other possible control strategies.

In particular, FIG. 5 shows the motor current and average torque produced by the OSSC faulty channel when controlling the converter current to track reference currents equivalent to the following control conditions:

- Reference torque of the faulty channel is set=100% of nominal maximum torque load, $T_n$;
- Reference torque of the faulty channel is set=50% of nominal maximum torque load, $T_n$;
- The faulty converter is switched off; and
- A three-phase short circuit is applied to the motor terminals.

It can be seen in the lower panel of FIG. 5 that when the reference torque of the faulty channel is set to 100% of the nominal torque load, the faulty converter produces assistive torque for the entire speed range from 0 to 1000 rad/s (but starts to produce drag torque for speeds higher than 1000 rad/s). In this case, however, as shown in the upper panel of FIG. 5 the magnitude of the motor current increases with the increase in motor speed and it reaches an unacceptable level (>200% In) at 1000 rad/s.

To try to reduce the motor current, the reference torque of the faulty channel could be reduced to 50% of the nominal maximum torque load. In this case, the level of motor current is indeed reduced compared to the case when the reference torque of the faulty channel is set to 100% of the nominal torque load. However, as shown in the lower panel of FIG. 5 in this case, assistive torque is only produced for a narrower speed range, from 0 to about 80 rad/s, whereas for speeds>180 rad/s, the faulty channel produces drag torque, and so the healthy channel must work harder to compensate for this.

Also shown in FIG. 5 is the case when the faulty converter is simply switched off after detecting the OSSC fault. In this case, the faulty channel produces drag torque at all motor speeds, and the current still increases significantly (albeit less so than in the first two examples).

Finally, FIG. 5 also illustrates the case when a three-phase short circuit is applied as described in United States Patent Application Publication No. 2017/0047728 (Goodrich Actuation Systems Limited). In this case, the maximum value of the current is ~100% In while the drag torque decreases with the speed increase.

Overlaid onto FIG. 5 is the trajectory in motor current and torque space achieved by deliberate variation of the reference torque of the faulty channel with respect to the motor speed during the starting phase using the approach described above in FIG. 4, wherein the reference torque is varied according to a certain relationship stored in a suitable Look Up Table (LUT) determined for the system in question to ensure that the motor current does not exceed its nominal value. Thus, by controlling the faulty channel according to such relationship, it can be seen from FIG. 5 that the faulty OSSC channel can be controlled to provide assistive torque at least initially (in FIG. 5 in the speed range from 0 to about 280 rad/s, thus representing an improvement in that respect compared to each of the above approaches except for the first approach in which the reference torque is set to 100% of the nominal torque load) whilst limiting the current within the faulty converter to not exceed a specified threshold value.

In this example, as described above, at a certain threshold motor speed (here, 400 rad/s) the control is then switched to using a three-phase short circuit is applied as described in United States Patent Application Publication No. 2017/0047728 (Goodrich Actuation Systems Limited), which works well once the motor is operating above a certain threshold speed.

Figure 6:
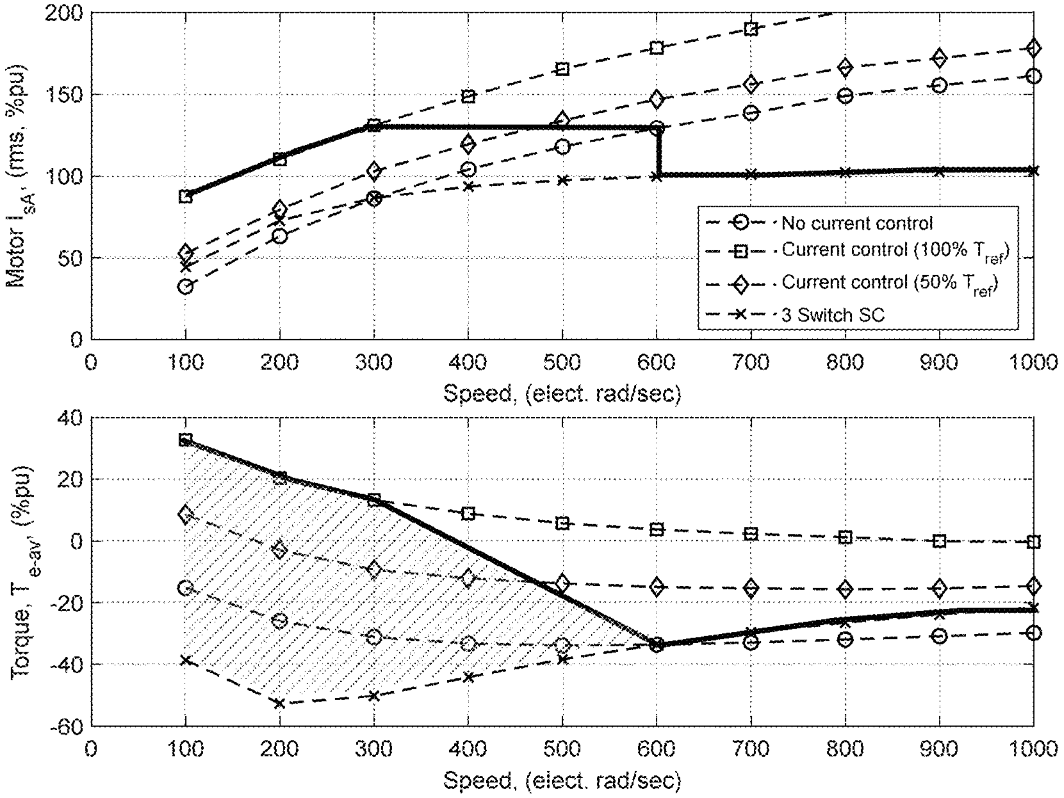
FIG. 6 shows schematically the motor current and torque when implementing a novel control scheme according to present embodiment compared to various other possible approaches according to a second example.

FIG. 6 is a similar plot but wherein a slightly different relationship is used for controlling the reference torque of the faulty channel, in this case to limit the motor current IA (rms) of the OSSC channel to 130% of the nominal load current. The torque trajectory shows higher reduction in the drag torque produced by the OSSC channel in comparison to the trajectory of FIG. 5 when the current is limited to approximately 100% of the nominal load current.

Various other relationships would be possible depending on the desired current threshold and the characteristics of the system in question. However, it will be appreciated from the above that using a variable reference torque, at least during the start-up phase of the motor, can provide various benefits compared to other possible approaches.

The benefits and advantages of using the proposed starting strategy of the motor when OSSC fault occurs to one channel are:

- Strategy can be used to maintain the system performance including acceleration demand with no increase of the electronics size.
- OSSC can be managed by utilising the remaining two legs of the faulty converter by adopting a different control strategy to the faulty channel while maintaining conventional control of the healthy channel.
- This method does not require increasing the size of the motor or the drive to overcome OSSC.
- The faulty converter can utilise the remaining healthy two-legs to produce positive torque during acceleration mode up to a reference speed and to reduce the drag torque generated by the shorted switch beyond the reference speed.

While the above examples have been provided primarily with reference to example three-phase inverter topologies, embodiments of the technology described herein extends to other configurations of inverter topologies, including but not limited to three-phase topologies (such as 3, 4, 5 etc.—phase topologies) and multiple three-phase topologies (such as 3, 6, 9, etc.—phase topologies). In each case, it will be understood that the number of components such as switches and freewheeling diodes may be varied accordingly.

It will be further understood that while the above embodiments of the technology described herein have been described with reference to a single level inverter that provides power directly to the windings of a motor, the inverter may instead be incorporated into a multi-level system and instead be configured to receive and/or provide AC output current to another or other inverter(s).

Additionally, while the above examples have been provided primarily with reference to example dual channel systems, embodiments of the technology described herein further extend to permanent magnet motor drive systems with different numbers of inverters and/or channels, including but not limited to single channel, dual channel, triple channel, etc. motor drive systems.

Variations on the examples described above fall within the scope of the claims.

The invention claimed is:

1. A method of operating a dual channel permanent magnet motor drive system for a motor, wherein each channel comprises a respective power inverter, the power inverter being controlled to produce torque based on a certain reference torque value, the method comprising:

determining that one of the channels of the dual channel permanent magnet motor drive system has a one switch short circuit (OSSC) fault, the dual permanent magnet motor drive system thus having a healthy channel and a faulty channel;

during start-up of the motor drive system, while a motor speed of the motor is below a certain threshold motor speed, controlling both channels of the dual channel permanent magnet motor drive system to provide torque, wherein the healthy channel is controlled to provide a desired output torque based on a first reference torque, wherein the faulty channel is controlled to provide an output torque based on a second reference torque, and wherein the second reference torque is varied according to a certain function of motor speed;

wherein during start-up of the motor drive system, whilst the motor speed is below a certain threshold motor speed: the second reference torque used for the control of the faulty channel is varied relative to the nominal maximum load torque for the faulty channel as a function of motor speed according to a certain relationship that has been determined based on characterising the permanent magnet motor drive system in question.

2. The method of claim 1, wherein the relationship is determined so as to keep the current in the faulty channel below a certain threshold current value and to further control the faulty channel to produce assistive torque within a certain range of motor speeds such that the faulty channel at least initially produces assistive torque.

3. The method of claim 1, wherein during start-up of the motor drive system, whilst the motor speed is below a certain threshold motor speed: the second reference torque that is used for controlling the faulty channel is monotonically decreased from the nominal maximum load torque for the faulty channel as the motor speed is increased from zero up to the threshold motor speed.

4. The method of claim 1, wherein when the motor speed exceeds the certain threshold motor speed, a different control operation is performed.

5. The method of claim 4, wherein for motor speeds above the certain threshold motor speed, a three-phase short circuit is applied to the motor terminals of the faulty channel.

6. A dual channel permanent magnet motor drive system for a motor, wherein each channel comprises a respective power inverter, the power inverter being controlled to produce torque based on a certain reference torque value, the system comprising:

a control circuit that is configured to control operation of the motor drive system; and a one switch short circuit (OSSC) fault detection circuit, wherein the control circuit is configured to:

when it is determined by the OSSC fault detection circuit that one of the channels of the dual channel permanent magnet motor drive system has a OSSC fault, the dual permanent magnet motor drive system thus having at least one faulty channel, during start-up of the motor drive system, whilst a motor speed of the motor is below a certain threshold motor speed:

control both channels of the dual channel permanent magnet motor drive system to provide torque, wherein the healthy channel is controlled to provide a desired output torque based on a first reference torque, wherein the faulty channel is controlled to provide an output torque based on a second reference torque, and wherein the second reference torque is varied according to a certain function of motor speed;

wherein during start-up of the motor drive system, whilst the motor speed is below a certain threshold motor speed: the second reference torque that is used for controlling the faulty channel is monotonically decreased from the nominal maximum load torque for the faulty channel as the motor speed is increased from zero up to the threshold motor speed.

7. The motor drive system of claim 6, wherein during start-up of the motor drive system, whilst the motor speed is below a certain threshold motor speed: the second reference torque used for the control of the faulty channel is varied relative to the nominal maximum load torque for the faulty channel as a function of motor speed according to a certain relationship that has been determined based on characterising the permanent magnet motor drive system in question.

8. The motor drive system of claim 7, wherein the relationship is determined so as to keep the current in the faulty channel below a certain threshold current value.

9. The motor drive system of claim 8, wherein the relationship is further determined to control the faulty channel to produce assistive torque within a certain range of motor speeds such that the faulty channel at least initially produces assistive torque.

10. The motor drive system of claim 6, wherein when the motor speed exceeds the certain threshold motor speed, a different control operation is performed.

11. The motor drive system of claim 10, wherein for motor speeds above the certain threshold motor speed, a three-phase short circuit is applied to the motor terminals of the faulty channel.

12. A non-transitory computer program product containing instructions that when executed by a processor perform a method of operating a dual channel permanent magnet motor drive system for a motor, wherein each channel comprises a respective power inverter, the power inverter being controlled to produce torque based on a certain reference torque value, the method comprising:

determining that one of the channels of the dual channel permanent magnet motor drive system has a one switch short circuit, "OSSC", fault, the dual permanent magnet motor drive system thus having a healthy channel and a faulty channel:

during start-up of the motor drive system, whilst a motor speed of the motor is below a certain threshold motor speed, controlling both channels of the dual channel permanent magnet motor drive system to provide torque, wherein the healthy channel is controlled to provide a desired output torque based on a first reference torque, wherein the faulty channel is controlled to provide an output torque based on a second reference torque, and wherein the second reference torque is varied according to a certain function of motor speed;

the product further comprising further instructions such that: during start-up of the motor drive system, whilst the motor speed is below a certain threshold motor speed: the second reference torque used for the control of the faulty channel is varied relative to the nominal maximum load torque for the faulty channel as a function of motor speed according to a certain relationship that has been determined based on characterising the permanent magnet motor drive system in question.

13. The non-transitory computer program product of claim 12, wherein the relationship is determined so as to keep the current in the faulty channel below a certain threshold current value and to further control the faulty channel to produce assistive torque within a certain range of motor speeds such that the faulty channel at least initially produces assistive torque.

14. The non-transitory computer program product of claim 12, comprising further instructions such that: during start-up of the motor drive system, whilst the motor speed is below a certain threshold motor speed: the second reference torque that is used for controlling the faulty channel is monotonically decreased from the nominal maximum load torque for the faulty channel as the motor speed is increased from zero up to the threshold motor speed.

15. The non-transitory computer program product of claim 12, comprising further instructions such that: when the motor speed exceeds the certain threshold motor speed, a different control operation is performed.

16. The non-transitory computer program product of claim 15, wherein for motor speeds above the certain threshold motor speed, a three-phase short circuit is applied to the motor terminals of the faulty channel.

* * * * *